Feb. 21, 1967  A. H. WENDEL  3,304,572

DIVIDED DUST COLLECTOR HOUSING

Filed Jan. 6, 1965  3 Sheets-Sheet 2

INVENTOR.
ADOLPH H. WENDEL

Dugger Broddock Johnson & Westman
ATTORNEYS

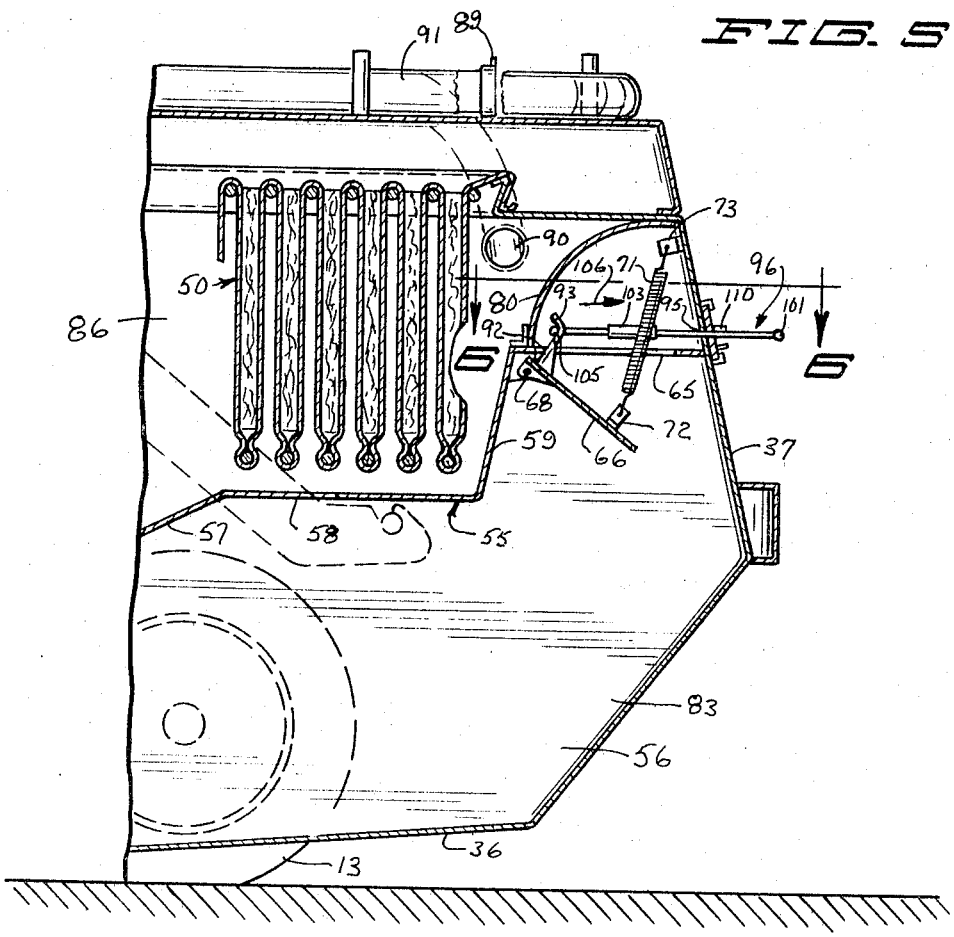

United States Patent Office 3,304,572
Patented Feb. 21, 1967

3,304,572
DIVIDED DUST COLLECTOR HOUSING
Adolph H. Wendel, Minneapolis, Minn., assignor to G. H. Tennant Company, Minneapolis, Minn., a corporation of Minnesota
Filed Jan. 6, 1965, Ser. No. 423,720
16 Claims. (Cl. 15—340)

The present invention has relation to dust collector housings for mobile sweeping machines and more particularly to a dust collector-filter housing which is mounted on the front of a sweeping vehicle and has a divider therein to separate a filter compartment from a dust collection chamber, and yet is easily dumped, and further directs air flow from the inlet opening of the housing to an opening in the divider adjacent an opposite wall of the housing and then to the filter compartment.

At the present time it is well-known in the art to utilize a mobile sweeping machine having a dust collector housing with filter bags or screens adjacent the upper portions of the housing. Usually material is swept by the brush on the mobile sweeping machine into the lower portions of the housing and a vacuum blower is supplied to cause air flow in through the inlet opening of the housing, adjacent the brush, through the filter bags and out through a provided exhaust opening or duct.

In the usual case the dust collector housing is divided only by the filter barrier. Thus air can flow through the lower inlet of the housing and any place across the filter barrier. Also, articles, such as stones, pieces of glass and other abrasive particles can be projected by the brush with a good deal of velocity and many times these will strike the filter barrier, particularly when the barrier is in the form of depending bags. If a lighted cigarette is swept into the dust collector housing the draft created by the suction blower can cause a fire to start, and this can in turn damage the filter barrier.

One of the important convenience features of many mobile sweeping machines is that the conventional dust collector housing is mounted in a manner so that it can be readily dumped. When there is no divider in the housing, the filter bags also can be shaken and the dirt from the filter bags will drop into the lower portions of the housing and be dumped out through the same opening the main pan portion of the housing is dumped. Therefore, it has been objectionable to put any kind of a divider in the filter housing to prevent objects from striking the filter barrier or bags, and also it has been objectionable to place any type of a divider to regulate and control the direction of air flow through the housing, because of the problem of cleaning or dumping the filter compartment.

The device of the present invention, as shown, presents a dust collector housing which has a lower pan portion for receiving dust and debris from a provided brush of a mobile sweeping machine on which the pan is mounted, and an upper filter barrier in the housing in the form of depending bags. The filter bags are sealed with respect to the housing around the periphery thereof and are formed as depending pockets which have spaced apart side walls through which air can flow. A divider or barrier sheet is placed below the filter bags and divides the housing into a filter compartment and a dust pan. The divider is located so there is an opening at the rear of the dust collector housing which permits the dumping of dust which collects or accumulates on the outside of the filter bags and drops down into the barrier from the filter compartment at the same time the main dust pan is empited or discharged. A sealing strip on the mobile sweeping machine is provided to normally close this opening in sweeping operations and when the housing is to be dumped, the opening is free from obstruction, and the dust can easily fall out from the top filter compartment.

Further, the air flow from a provided suction blower on the mobile sweeping machine is regulated by the divider placed in the housing so that the air flows in through the normal sweeping opening of the housing and forwardly (when the housing is front mounted) to adjacent the opposite end wall of the housing. The air passes through a port or opening in the divider into the filter compartment, through the filter bags and out through an exhaust opening.

A spring-loaded trap door is provided for the opening and is normally held in open position. The spring-loaded trap door for the opening in the divider of the housing is held open with a fusible link so that if the temperature in the housing should rise, the fusible link will melt, and the trap door will automatically close to shut off air flow.

The unit is also provided with a vacuum take off so that it can be used as a vacuum cleaner. The trap door is manually shut to prevent air flow through the normal sweeping opening of the housing. The vacuum in the filter compartment is taken off through a flexible conduit open to the filter compartment. The conduit can be capped or covered during normal sweeping operation with the trap door open. This gives greater utility to the machine and increases its usefulness.

It is therefore an object of the present invention to provide a divider for a dust collector housing which controls air flow through the housing, shields a provided filter in the housing and permits easy dumping of dust and dirt from an upper compartment of the housing formed by the divider.

In the drawings,

FIG. 5 is a vertical sectional view of the device of FIG. 1 showing an alternate mechanism for holding the door in the housing divider in open position;

FIG. 6 is a fragmentary top plan view of the device of FIG. 5; and

FIG. 7 is a perspective view of the device of FIG. 5.

Figure 1:
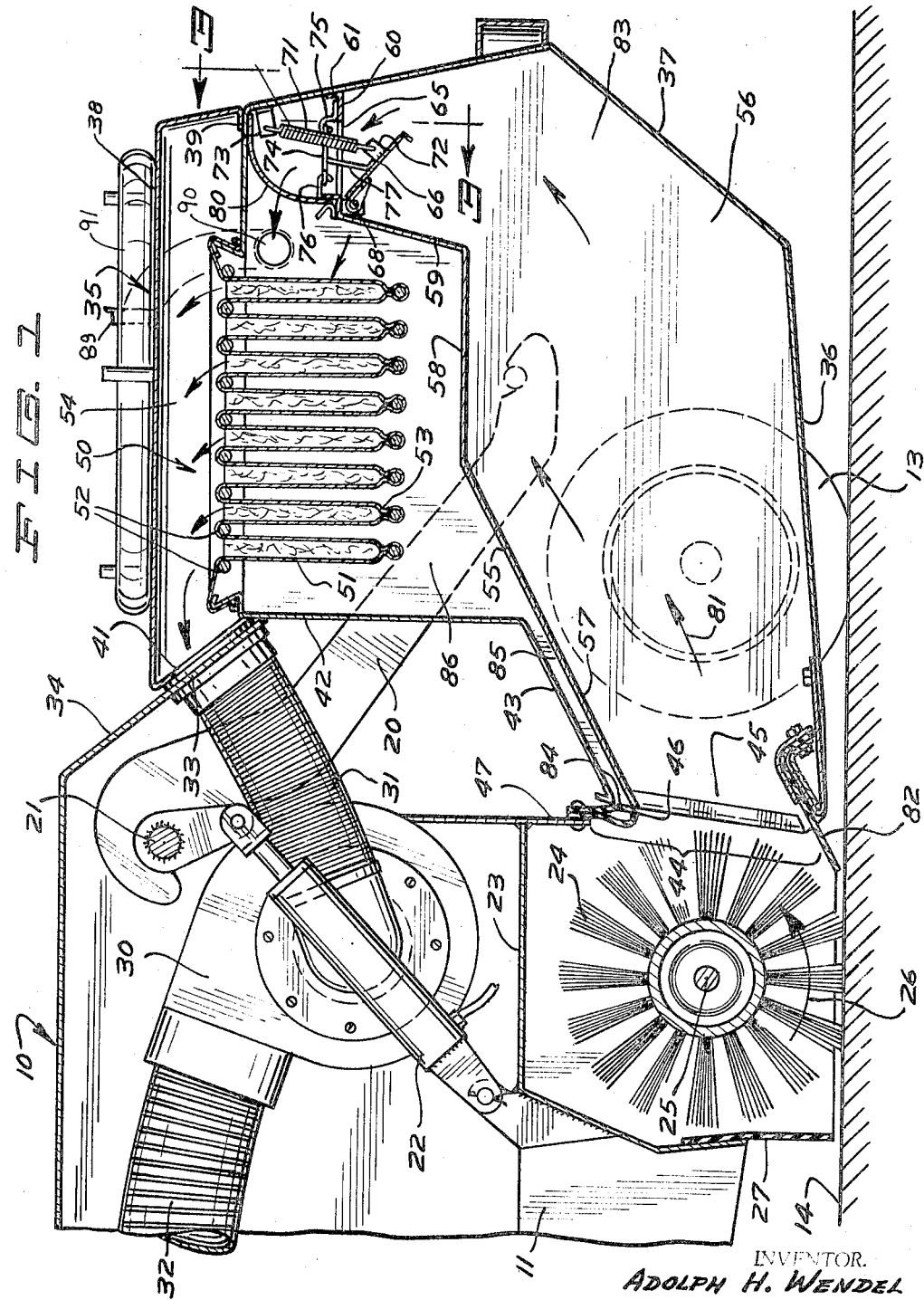
FIG. 1 is a vertical sectional view of a front portion of a mobile sweeping machine having a dust collector housing made according to the present invention installed thereon.

Referring to the drawings and numerals of reference thereon, a mobile sweeping machine illustrated generally at 10 (see FIG. 2) includes a main frame 11 that has a rear steering and propulsion wheel 12 and front support wheels 13 rotatably mounted thereon. The mobile sweeping machine is powered through a suitable power mechanism (not shown). The machine has a steering wheel 15 and operator seat 16 and other controls illustrated generally at 17 for operating the sweeping machine.

Figure 2:
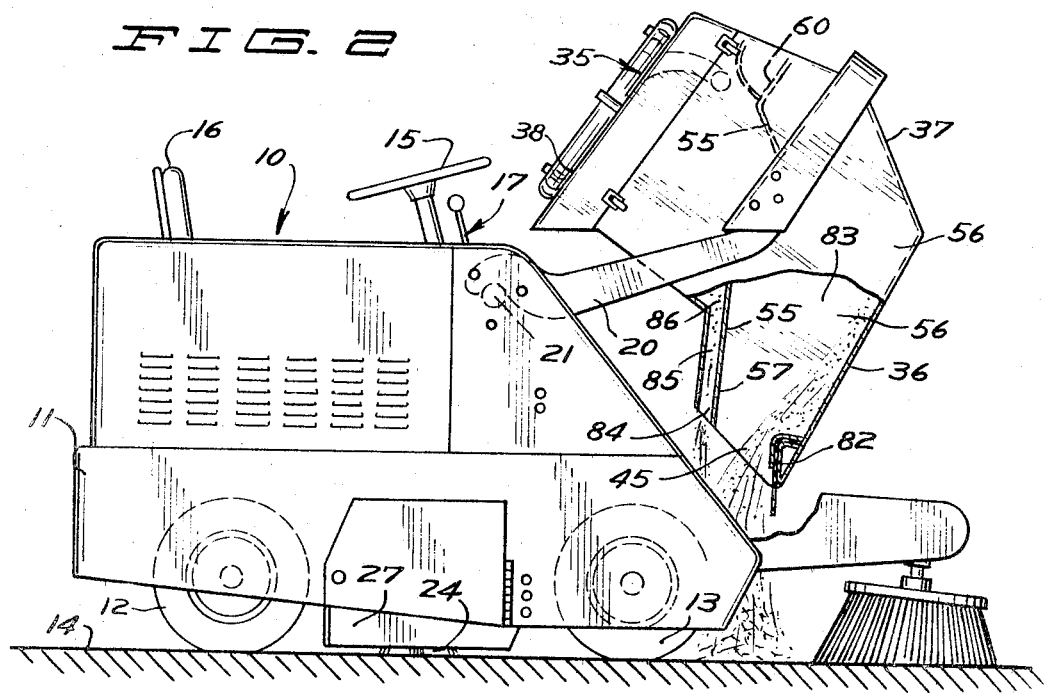
FIG. 2 is a side elevational view of a moble sweeping machine having a dust collector housing made according to the present invention installed thereon and shown in a dumping position.

The machine has a pair of transversely spaced apart lift arms 20 which are mounted onto a rock shaft 21. The rock shaft 21 is rotatably mounted at opposite ends thereof on the machine and has a suitable hydraulic cylinder 22 for rotating the shaft through a limited arc so that the arms can be moved from a lowered sweeping position as shown in dotted lines in FIG. 1 to a raised position as shown in FIG. 2. The controls for the hydraulic cylinder are conventional and well-known in the art. The cylinder is attached to a bracket on the frame and to an arm which is welded to the rock shaft.

The mobile sweeping machine also has a brush housing 23 which extends transversely to the machine adjacent the lower portion thereof and a brush 24 is rotatably mounted in the housing for rotation about an axis 25. The brush is mounted on suitable bearings and is powered in any usual or preferred manner. The brush is rotated in direction as shown by the arrow 26 in FIG. 1. The brush housing 23 has an attached rear skirt 27 which is fastened to the housing and extends down to position just slightly raised from the supporting surface 14. The skirt 27 can also extend along the sides of the brush.

A suction blower 30 is mounted on the sweeping machine and has a suction conduit 31 connected to the inlet thereof and an exhaust hose 32 leading from the outlet. The suction blower is powered from the power source of the machine in a conventional manner and the conduit 31 leads to port 33 at a sloping front wall 34 of the vehicle.

A front dust collector-filter housing assembly 35 is mounted on the lift arms 20 and is positioned between the arms. The housing has trunnions which rest in notches at the outer ends of the lift arms and it is supported in this manner. The housing 35 has a bottom wall 36, an irregularly shaped front wall 37 and a cover member 38. The cover member 38 is removably joined to the main portion of the housing along a flange 39. An exhaust air outlet opening 41 is provided at the rear of the cover member 38 and this communicates with the suction port 33 on the wall 34 of the mobile frame for the sweeping machine. A sealing ring can be provided to seal these openings with respect to each other. A rear wall 42 of the housing 35 extends downwardly from the exhaust air outlet opening and a filler section wall 43 joins wall 42 and extends rearwardly and downwardly toward an ejection opening 44 at the front of the brush housing 23.

At the rear portions of the dust collector housing 35 there is defined a large debris inlet opening 45 which is open to the ejection opening 44 and aligns therewith. The inlet debris opening 45 is defined by side walls 56, 56 of the housing, bottom wall 36 and a first section 57 of a baffle plate 55. A resilient sealing strip 46 is mounted onto a stub wall 47 just above the ejection opening 44 on the main machine. The sealing strip 46 protrudes downwardly into the ejection opening.

In the housing 35 a filter barrier 50 is mounted adjacent the top portions thereof. The filter barrier 50 comprises a plurality of downwardly depending upwardly opening pockets 51 which are positioned side-by-side. The pockets are formed with a strip of cloth 51 that is looped over cross support rods 52 which extend transversely across the machine. The pockets are sewed closed along their edges and are filled with spacers 53 which hold the large side surfaces of pockets spaced apart. The upper peripheral edges of the pockets are attached to a suitable peripheral strip of cloth and this strip of cloth is sealed around the periphery of the housing by flange 39. As can be seen, the pockets depend a substantial way down into the housing 35. The filter barrier 50 divides the housing 35 into an upper plenum chamber 54 from which air is drawn through the exhaust air outlet opening 41 and the suction port 33 by the suction blower 30.

A more detailed showing of the filters, the construction of the sweeping machine, means for powering the brush, etc. and other details is present in Patent No. 3,160,908.

The housing 35 is further divided into two separate compartments, an upper filter compartment or chamber 86 and a lower dust pan chamber 83, by a transversely extending baffle plate 55. The baffle plate, as shown, is attached between the side walls 56, 56 of the housing. The baffle plate has a first section 57 which extends substantially parallel to and spaced slightly downwardly from the rear filler wall section 43 of the housing. This forms a dust outlet opening 84. The baffle plate then extends upwardly in this plane toward the filters 50. A second section 58 of the baffle is substantially horizontal and is spaced below the filter bags 50 a short distance.

Adjacent the forward portions of the housing 35, as shown (the portion of the housing opposite from the inlet opening 45), the baffle has a section 59 that extends upwardly and then the baffle extends forwardly with a top wall section 60 and is attached as at 61 to the forward wall 37 of the housing.

Figure 3:
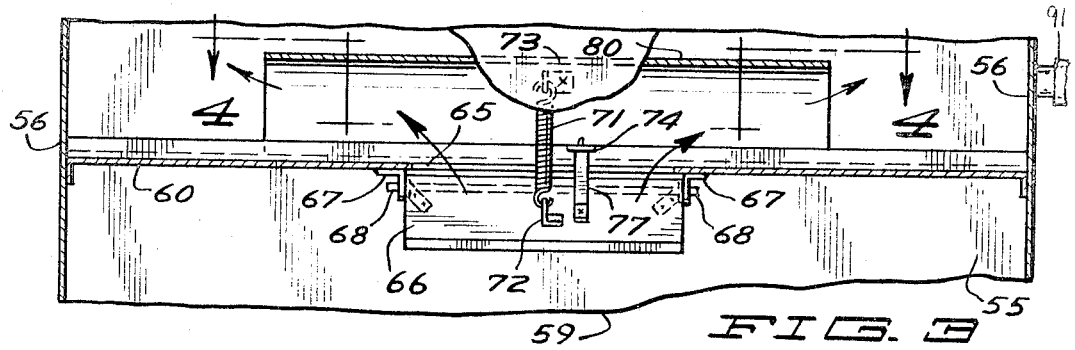
FIG. 3 is a fragmentary sectional view take as on line 3—3 in FIG. 1.
Figure 4:
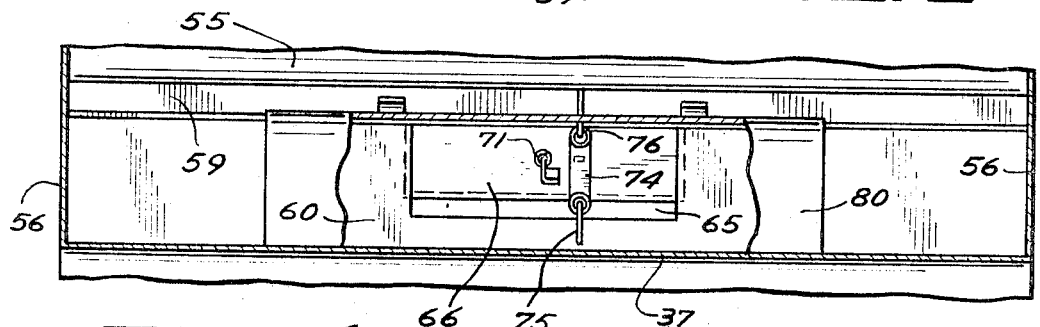
FIG. 4 is a fragmentary sectional view taken as on line 4—4 in FIG. 3.

The top wall section 60 extends transversely across the housing between the side walls 50, 56 of the housing. As shown in FIGS. 3 and 4, the top wall 60 has an opening 65 defined therein. The opening 65 is considerably narrower than the distance between the walls 56, 56, as shown, and a trap door 66 of sufficient size to cover the opening 65 is hingedly attached with suitable brackets 67, 67 and a rod 68 to the wall 60. The trap door 66 is positioned below the wall 60 and is hinged adjacent the wall section 59. The trap door 66 is urged upwardly toward a closed position with a tension spring 71 that is fastened as at 72 to the door and passes through the opening 56 and is fastened to a bracket 73 attached to the front wall 37 of the housing 35.

In order to hold the door 66 open under normal conditions, a heat sensitive fusible link 74 is manually removably attached between a pair of suitable brackets 75 and 76, respectively, and is positioned just above the opening 65 and actually spans the opening. One of the brackets 75, for example can be slidably mounted to permit removal or installation of the link and can be locked in place with a bolt. A finger 77 is fixed to the top surface of the trap door 66 and protrudes upwardly through the opening 65 and engages the fusible link 74, as shown in FIGS. 1, 3 and 4. As long as the temperature of the air flowing past the fusible link 74 remains below the link melting point, the trap door will remain propped open. However, if the temperature rises above the melting point of the link 74 the link will melt and the finger 77 will have no support. The spring 71 will then pull the trap door closed and shut the opening 65. The trap door also protrudes into the normal air stream or flow and acts as a deflector to cause the air to change direction as it flows into the filter compartment. The door is hinged on its side adjacent the sweeping opening of the housing.

A suitable part-cylindrical diffuser 80 is removably attached between the front wall 37 of the housing and wall 60 so that it overlies the opening 65. The diffuser 80 is open at its opposite ends to permit air flow out through the ends of the diffuser to promote better distribution of the air flowing through opening 65. Any suitable brackets can be used for mounting diffuser 80. Diffuser 80 does have to be removed for replacing fusible links or for servicing the trap door for any reason.

Thus, when the unit is to be used, for sweeping, the brush will be rotating in direction as indicated by arrow 26, and suction blower 30 will be operating. Air will then flow in through the inlet opening 45 of the housing 35 as shown by arrow 81 and will flow upwardly and forwardly through the lower chamber 83 toward and through the opening 65, past the diffuser 80 and will pass through the filter pockets into the plenum chamber 54 and out through the air outlet opening 41 and through the suction blower. Dust, dirt and other material being swept by the brush 24 will be swept over the rear edge portions of the housing and strip 82 into the lower compartment 83 which is below the interior divider baffle 55. Any hard objects projected by the brush into the chamber 83 will either fall directly down into the bottom panel 36 or if they are projected with sufficient velocity, will be impelled against the divider baffle 55 and fall harmlessly into the lower portions of the chamber 83. Some objects may even strike the trap door, which acts as a deflector. The heaviest dust particles will collect in chamber 83. The sharp objects such as glass, will not strike the filter pockets and this will prevent tears and holes from forming in the filter pockets, and will maintain the filter's integrity and efficiency for a long time.

Note that the sealing strip 46 will seal a dust outlet opening 84 which leads into a narrow passageway 85 which in turn opens into the main filter chamber 86 of the housing 35. The strip 46 will prevent air from flowing in through the opening 84, and will cause all air flow from the suction blower to pass through opening 45. The dust outlet opening 84 extends across the width of the housing 35.

If a fire should develop in the compartment 83 due to picking up a lighted cigarette butt or a similar circumstance, and the heated air is pulled through opening 65, once the temperature reaches the melting point of the fusible link 74 (these are commercially available fusible links) the link will melt and the trap door 66 will be closed thereby shutting off air flow and preventing spread of the fire in the lower compartment.

Not only that, when the housing is raised to position as shown in FIG. 2 through the extension of hydraulic cylinder 22, for dumping the lower pan portion 83 at the same time, any dust collected on the top of the baffle 55, which has fallen down from the outsides of the filter bags, will be discharged out through passage 85 and dust outlet opening 84. The sealing strip 46 remains on the main portion of the sweeping machine when the housing is dumped so that there is no difficulty in emptying the upper filter compartment 86 of accumulated dust. If desired, suitable shakers can be used for removing dust from the filter bags. Thus the advantage of a baffle for preserving and prolonging the life of the filter pockets or barrier and direct air flow only in the directions desired, is available, and there is no difficulty encountered in dumping or cleaning the upper chamber 86 of accumulated dust. The dumping is fast and complete for both compartments in the housing.

When the trap door 66 is manually closed by loosening one of the brackets 75, for example, and removing the link 74, the mobile unit can alternately be used as a vacuum cleaner. As shown, the side of the housing has a port 90 defined therein and a suitable vacuum cleaner hose 91 is attached to a conduit open to the port in a conventional manner. The hose is normally coiled as shown on the top of the cover member 38 of the housing and a suitable cap 89 or sealing member can be placed over the open end of the hose when the trap door is open and the mobile machine is being used for normal sweeping operations. The cap can be any type of a cap such as a lens cap or other suitable sealing member.

With the trap door closed by removing the link 74 and after taking the cap off the vacuum cleaner hose 91, the machine can be used as a vacuum cleaner merely by driving the suction blower 30 to partially evacuate the filter compartment. Air will then be drawn in through the port 90 and the hose 91 and through the filters to the suction blower. The hose can be used with any of the conventional vacuum cleaner attachments or tools to clean remote areas, if desired.

While the device shown in FIGS. 1–4 is made so that the trap door can be closed manually after removing the upper cover and filter barrier, in order to facilitate using the mobile sweeping machine of the invention as a vacuum cleaner, the device shown in FIGS. 5–7 is utilized. The housing, baffle plate, filter barrier and other components are exactly the same in the form of the invention shown in FIGS. 1–4, but the mechanism for holding the trap door 66 open is different. As can be seen, the trap door 66 for covering the opening 65 is mounted on the same type of bracket and the hinge line is along the side of the trap door 66 adjacent the inlet opening 45 of the housing. The spring 71 and attachment brackets 72 and 73 are used as before.

The trap door, however, has a lever 92 mounted thereon adjacent the rear portions of the housing. The lever has a pair of ears 93 at the upper ends thereof and a longitudinally extending slot 94 defined therein which is open at the top end of the lever.

The front wall 37 of the sweeping housing has a opening 95 defined therein which aligns with the lever 92. A locking handle 96 is inserted through the opening 95. The locking handle comprises a two part handle which has a first section 100 that has a "T" shaped end member 101 and which is threadably mounted as at 102 into a fusible link 103, which is made of a material of low melting point. The second section 104 of the handle also has a T shaped end member 105. The second section 104 of the handle can also be threadably mounted into the fusible link 103. The link 103 is made of a material which will melt at the desired temperature just as the fusible link in the first form of the invention.

Further, the second section 104 of the handle fits into the slot 94 on the lever 92 and the T end member 105 bears against the lever so that by pulling on the handle in direction as indicated by arrow 106 the trap door 66 will pivot downwardly into position as shown in FIG. 5.

A locking or stop washer 107 is mounted over the first section of the handle 100 and is rotatably positioned within a small housing 108 that is in turn attached to the outside of the dust collector housing. A lug 110 is fixed on the first section of the handle 100. The locking washer or stop washer 107 has a center opening 111 that is shaped like a key hole. The locking washer 107 has a small control rod 112 mounted thereon so that the washer can be rotated about its axis on the handle and within the housing 108. When the opening or key hole 111 is aligned so that the lug 110 corresponds to the notch in the key hole 111, the handle will slide through the washer. When the washer is rotated, the lug 110 will strike the washer and will be held in position as shown in FIG. 5. Thus, by rotating the washer properly so that the lug 110 engages the washer, the trap door 66 will be held in an open position, as shown. By rotating the washer 107 to position so that the key hole notch aligns with the lug 110 the lever will be permitted to move inwardly in direction opposite than that indicated by arrow 106 and the trap door 66 will be permitted to close.

Once the trap door is closed by aligning the notch in washer 107 with lug 110 to permit handle 100 to move inwardly, the vacuum hose 91 can be uncapped and used in the manner previously described.

The quick manual release of the trap door 66 makes the use of the vacuum hose much simpler than in the previous form of the invention. However, the vacuum hose can be used with both forms of the invention as previously explained.

Through the use of the vacuum takeoff and hose together with the quick closable trap door 66 the baffle plate which divides the housing into two compartments makes the closing off of the sweeping opening for the brush from the suction chamber very easy and thereby greatly increases the efficiency and adaptability for multiple use of the mobile sweeping machine.

With the door held in open position by the handle whenever the temperature rises sufficiently so the link 103 melts, the handle will separate and the trap door will close under urging of spring 71, as in the first form of the invention. The handle has the fire safety feature and the quick closing feature. If the temperature gets high enough to melt link 103, the handle separates and door 66 will be pulled closed by the spring.

What is claimed is:

1. In a sweeping machine having a suction blower thereon, a dust collector housing comprising an enclosure mounted on the machine and having a debris opening and an air outlet, means to connect the air outlet to the suction blower to partially evacuate the housing, a filter barrier in said housing, a baffle in said housing dividing said housing into two compartments with the debris opening in one compartment and the air outlet in the other compartment, said baffle having an opening defined therethrough to form a predetermined path of flow from the debris opening to the air outlet of the housing, a door of size to cover the opening defined in said baffle, bias means to urge said door toward a closed position covering said opening, and means to hold said door in an open position, said last mentioned means including a link which will melt when the temperature in said housing exceeds a predetermined level, thereby permitting said bias means to move said door to closed position.

2. The combination as specified in claim 1 wherein said means to hold said door in an open position includes a manually releasable element which can be moved to permit the door to move to closed position.

3. The combination as specified in claim 2 and a separate port open to the compartment which also has the air outlet therein, and removable means to block air flow through the port.

4. In a sweeping machine having a brush and a suction blower thereon, a dust collector housing comprising an enclosure mounted on the machine and having a debris opening adjacent the brush to receive swept debris therefrom and an air outlet, means to connect the air outlet to the suction blower to partially evacuate the housing, a filter barrier in said housing, and an air tight baffle in said housing dividing said housing into upper and lower compartments with the debris opening in the lower compartment and the filter and air outlet in the other compartment, said baffle having an opening defined therethrough to form a predetermined path of air flow from the debris opening to the air outlet of the housing, and the baffle being spaced downwardly from an upper wall defining the upper compartment of said housing to form a dust outlet for the upper compartment adjacent to the debris opening and flexible sealing means on said sweeping machine adapted to cover said dust outlet and substantially prevent movement of air through the dust outlet into the upper compartment when said housing is mounted on said machine in sweeping position.

5. The combination as specified in claim 4 and means on the machine to elevate said housing to a dumping position, wherein material in said lower compartment and said upper compartment are dumped simultaneously through the debris opening and the dust outlet respectively.

6. The combination as specified in claim 5 and a door covering the opening defined in said baffle, bias means to urge said door toward a closed position covering said opening, and means to hold said door in an open position, said last mentioned means including a link which will melt when the temperature in said housing exceeds a predetermined level, thereby permitting said bias means to pull said door to closed position.

7. The combination as specified in claim 6, wherein the means to hold the door in open position includes manually releasable means which when released permits the door to close, a separate port open to the chamber with the air outlet therein, and removable means to block air flow through said port.

8. In a mobile sweeping machine having a powered sweeping brush and a vacuum blower thereon, a dust collector housing comprising an enclosure mounted on the machine and having a debris opening defined by the walls of the housing adjacent the brush to receive debris swept by the brush and an air outlet adjacent the upper portion thereof, means to connect the air outlet to the vacuum blower to partially evacuate the housing, a filter barrier adjacent the upper portions of said housing, and a baffle plate in said housing dividing said housing into an upper compartment and a lower compartment, said baffle plate having an opening defined therethrough adjacent a wall of said housing opposite from the debris opening of said housing, means defining a dust outlet in the upper compartment adjacent the debris inlet, and sealing means on said sweeping machine adapted to cover said dust outlet when said housing is mounted on said machine in sweeping position.

9. The combination as specified in claim 8 and means on the machine to elevate said housing to a dumping position, material in said lower compartment and said upper compartment thereby being dumped simultaneously through the debris opening and dust outlet of said housing respectively.

10. The combination as specified in claim 8 wherein the filter barrier is formed as depending bags and the baffle is positioned to intercept objects projected into the housing by the brush.

11. In a mobile sweeping machine having a powered brush for sweeping the surface over which the machine moves, a suction blower on the machine and a pair of spaced apart lift arms on the machine moving between raised and lowered position, a dust collector housing comprising an enclosure mounted between the lift arms for movement therewith, said enclosure having a debris opening positioned to receive swept material from the brush with the arms in lowered position and an air outlet adjacent the upper portion of the enclosure, means to connect the air outlet to the suction blower to partially evacuate the housing and provide air flow from the debris opening to the air outlet of the enclosure, a filter barrier in said housing positioned below the air outlet, and a baffle plate in said housing dividing said housing into an upper compartment and a lower compartment, said baffle plate having an opening defined therethrough adjacent a wall of said housing opposite from the debris opening of said housing and said baffle plate being spaced downwardly from an upper wall of said upper compartment to together define a dust outlet just above the debris opening, sealing means on said mobile sweeper adapted to cover said dust outlet when said housing is mounted on said machine in sweeping position, material in said upper and lower compartments being dumped simultaneously through the dust outlet and debris opening, respectively when the arms are moved to their raised position.

12. The combination as specified in claim 11 and a door covering the opening defined in said baffle plate, spring means to urge said door toward a closed position covering said opening, and means to hold said door in an open position, said last mentioned means including an element which will melt when the temperature in said housing exceeds a predetermined level, thereby permitting said spring means to pull said door to closed position.

13. The combination as specified in claim 12 wherein said means to hold the door in open position includes a manually releasable element which, when released, permits the door to close, a separate port open to the upper compartment defined in the housing, and removable means to block air flow through said port.

14. The combination as specified in claim 13 wherein said manually releasable element extends outside the housing.

15. The combination as specified in claim 12 wherein said door is hinged along an edge thereof nearest the debris opening of the housing and projects into the lower compartment to deflect air flow passing through the opening in the baffle plate.

16. The combination as specified in claim 14 and a door covering the opening defined in said baffle plate, spring means to urge said door toward a closed position covering the opening, manually releasable means to hold the door in open position, a separate port open to the upper compartment defined in said housing, and removable means to block air flow through said port.

References Cited by the Examiner

UNITED STATES PATENTS

| 1,341,129 | 5/1920 | Hopkins | 55—217 |
| 1,560,612 | 11/1925 | Sims | 15—340 X |
| 2,175,642 | 10/1939 | Replogle | 15—334 |
| 3,160,908 | 12/1964 | Peabody et al. | 15—352 X |

FOREIGN PATENTS

| 579,401 | 6/1933 | Germany. |
| 236,764 | 12/1961 | Australia. |

ROBERT W. MITCHELL, *Primary Examiner.*